(12) United States Patent
Hubert et al.

(10) Patent No.: US 9,482,272 B2
(45) Date of Patent: Nov. 1, 2016

(54) DEVICE FOR THE RELATIVE DISPLACEMENT OF TWO PARTS UNDER DIFFERENTIAL PRESSURE

(75) Inventors: Sébastien Hubert, Gradignan (FR); Philippe Alonso, Pessac (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 124 days.

(21) Appl. No.: 14/240,579

(22) PCT Filed: Sep. 7, 2012

(86) PCT No.: PCT/EP2012/067569
§ 371 (c)(1),
(2), (4) Date: Mar. 14, 2014

(87) PCT Pub. No.: WO2013/034733
PCT Pub. Date: Mar. 14, 2013

(65) Prior Publication Data
US 2014/0224030 A1  Aug. 14, 2014

(30) Foreign Application Priority Data
Sep. 7, 2011 (FR) ...................... 11 57914

(51) Int. Cl.
*F16C 29/02* (2006.01)
*F16J 15/06* (2006.01)
(52) U.S. Cl.
CPC .............. *F16C 29/02* (2013.01); *F16J 15/062* (2013.01); *F16J 15/064* (2013.01)
(58) Field of Classification Search
USPC ........................................................ 73/756
See application file for complete search history.

(56) References Cited

U.S. PATENT DOCUMENTS

| 4,000,837 | A | * | 1/1977 | Walther | B22D 41/40 222/512 |
| 4,162,391 | A | * | 7/1979 | Sciaky | H01J 37/18 219/121.13 |
| 4,229,655 | A | * | 10/1980 | Ryding | H01J 37/18 250/400 |
| 4,543,981 | A | * | 10/1985 | Bates | B22D 41/24 137/315.3 |

(Continued)

FOREIGN PATENT DOCUMENTS

| DE | 4436224 C1 | 3/1996 |
| WO | 2008109097 A1 | 9/2008 |

OTHER PUBLICATIONS

International Search Report for PCT/EP2012/067569 dated Dec. 13, 2012.

(Continued)

*Primary Examiner* — Lisa Caputo
*Assistant Examiner* — Tran M Tran
(74) *Attorney, Agent, or Firm* — Pearne & Gordon LLP

(57) ABSTRACT

Two detectors mounted on footprints (12) and (13) of a plate (5) can be permuted and placed in turn in front of a measuring location set in a plate (1) connected to the plate (5). Concentric sealing joints (24, 25) bound with the plates (1, 5) a closed cavity wherein a vacuum should be created to perform measurements. The joints enable the plate to be mutually moved without sealing loss. The invention is however applicable to any device implying a relative displacement of two parts in front of each other, a stronger pressure existing outside of the parts than between them, which tends to collapse them against each other.

7 Claims, 4 Drawing Sheets

(56) References Cited

U.S. PATENT DOCUMENTS

Figure 1:
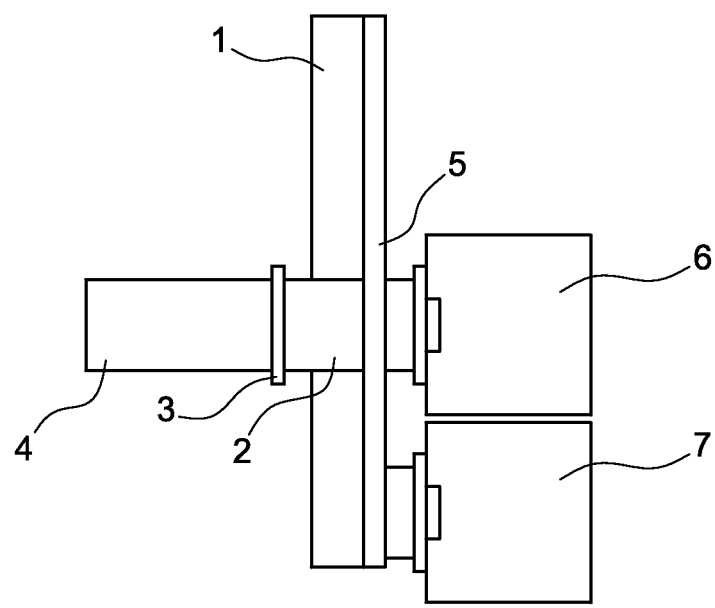

| | | | | |
|---|---|---|---|---|
| 4,747,580 A * | 5/1988 | Tinnes | ............ | B22D 41/28 |
| | | | | 222/598 |
| 4,818,838 A * | 4/1989 | Young | ............ | H01L 21/67778 |
| | | | | 219/121.12 |
| 4,911,338 A * | 3/1990 | Winkelmann | ............ | B22D 41/28 |
| | | | | 164/337 |
| 5,139,237 A * | 8/1992 | Fricker | ............ | B22D 41/34 |
| | | | | 222/600 |
| 6,515,288 B1 * | 2/2003 | Ryding | ............ | F16C 29/025 |
| | | | | 250/441.11 |
| 7,322,496 B2 * | 1/2008 | Yotabunn | ............ | B22D 41/28 |
| | | | | 222/597 |
| 8,215,022 B2 * | 7/2012 | Feizi | ............ | B26D 7/00 |
| | | | | 30/240 |
| 8,598,524 B2 * | 12/2013 | Persoon | ............ | H01J 37/185 |
| | | | | 250/310 |
| 2005/0242515 A1 * | 11/2005 | Brooks | ............ | F16J 15/3464 |
| | | | | 277/370 |
| 2010/0135751 A1 | 6/2010 | Musha et al. | | |

OTHER PUBLICATIONS

Written Opinion for PCT/EP2012/067569.

* cited by examiner

DEVICE FOR THE RELATIVE DISPLACEMENT OF TWO PARTS UNDER DIFFERENTIAL PRESSURE

The present invention relates to a device for the relative displacement of two parts under differential pressure; one of the contemplated applications thereof is the permutation of detectors under vacuum involving measurements under vacuum, but other applications exist, such as handling valve spools. It is attempted to ensure the convenient displacement of parts in front of each other when a positive pressure differential exists between a location outside of the parts and a location located between the parts, which produces forces collapsing parts against each other and consequential friction forces. Sealing should also be kept between the parts in spite of their displacements for the pressure differential to be maintained.

This is how some physical phenomena must be successively observed by different detectors, which are successively placed in front of the measuring location. The situation is more delicate when observations should be performed under vacuum or more generally at a reduced pressure, and when a balance should be found between the maintenance of the vacuum and necessity of moving the detectors.

One way of operating is to location both entire detectors in a common vacuum enclosure and to successively displace them in front of the measuring location. This way of operating can only work with some detectors that can operate under vacuum (which excludes for example liquid cooled detectors) and in practice the detectors should also be small enough for the overall space of the device not to become excessive: consequently, the cameras are generally too bulky for this way of operating to be applied to them.

Another way of operating is to successively assemble and disassemble the detectors in front of the measuring location. The advantage of the device is that it is simple and compatible with most detectors. The drawback lies in the assembly and disassembly times, as well as in the requirement to have thus generally to break the vacuum upon assembling the detectors, and then restore it when the next detector is assembled. Furthermore, the invariable detector position during successive assemblies is not ensured.

The invention relates to a different device, which finds a balance between the permutation easiness of the first device and the possibility of making do with a low volume vacuum enclosure, as in the second device.

Generally, the invention relates to a device for the relative displacement of two parts maintaining a pressure differential between a location outside of the parts and a location having a lower pressure located between the parts, characterised in that one of the parts is polished and the other part includes a non-deformable joint which contains a lubricant reservoir and is compressed between the parts. The parts comprise plates and it is between the plates that the joint is compressed, one of the plates being polished and the other carrying the joint.

Both parts contribute to bounding a vacuum or reduced pressure low volume enclosure with the sealing joint. The external portion of the parts is kept at ambient pressure. No sealing breaking off occurs during the displacements of the parts in front of each other. The combination of the polished surface and the lubricated joint ensures low friction.

A collapse of the plates against each other, an excessive clamping of the joint, and the destruction thereof or the impossibility to displace the parts because of the force bringing the plates closer produced by the ambient pressure on their external faces should be avoided. It should be noted that this problem of joint collapse under a differential pressure only occurs with a substantially planar joint provided between two bearing surfaces having the same shape, but that it is absent in common situations where a rotative shaft is provided in a circular bearing through a joint that is also circular which surrounds it and where a joint separates two media at different pressures on both sides of the shaft and the bearing: the differential pressure exerts a side string on the joint, which does not disturb a rotation of the shaft at all.

The rigid joint of the invention maintains the gap between the parts and thus prevents the disappearance of intermediate volume at reduced pressure and the increase in friction which would be the consequence of a direct contact between the parts. The lubrication of the rigid joint reduces friction when the parts move on each other.

The parallelism of the parts is enhanced if another rigid joint is compressed between the parts; it is rectilinear and directed along a direction of mutual displacement of the parts, provided at a central region of the parts; its function is to restrict the deflection of the parts towards each other.

The non-deformable joint ensures in itself the sealing of the space between the parts if it has a continuous contour. However, this is not mandatory, since a second joint can be added to improve sealing or ensure it on its own if need be: this second joint has a continuous contour, and it is also compressed between both parts; it is flexible but its collapse is restricted by the non-deformable joint, which further avoids excessive friction.

When both joints are present, they are advantageously located around each other, or even concentric, the second flexible joint being located at a more central part region than the non-deformable joint.

The lubricant reservoir can consist of a cavity hollowed out into the joint and opening to the polished part. On the other hand, this joint advantageously bears against the polished part through at least one planar face, and possibly through two planar faces between which the cavity is located so as to have sufficient contact area.

Figure 2:
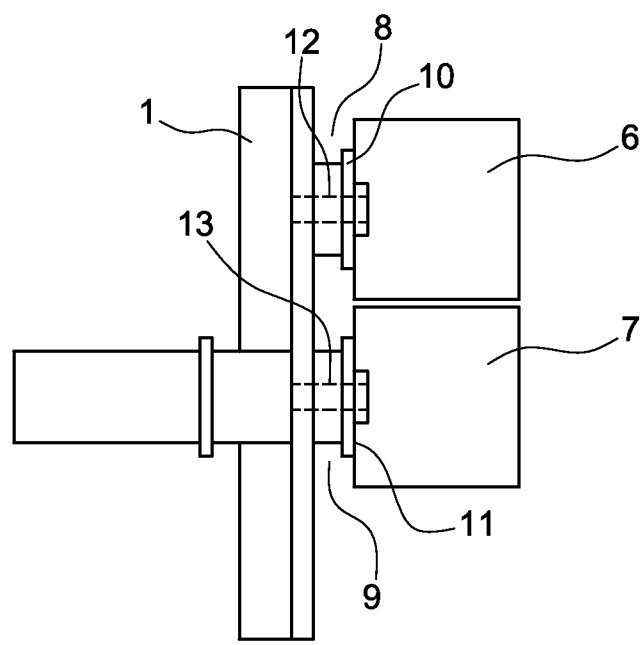
Figure 3:
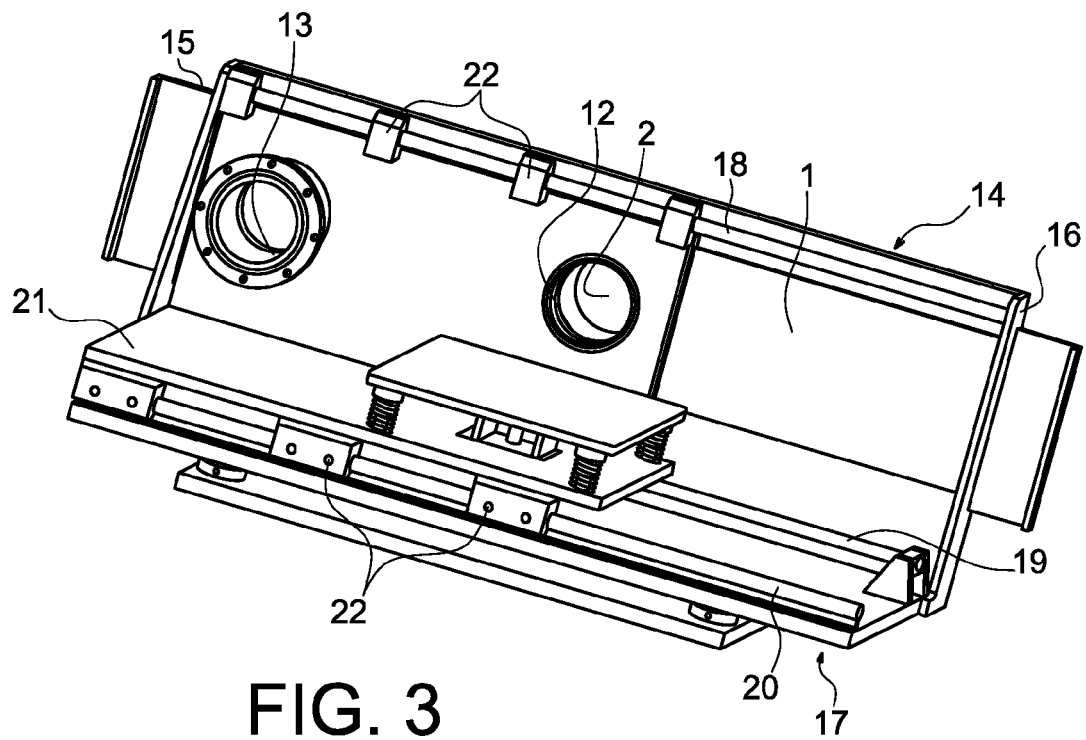
Figure 4:
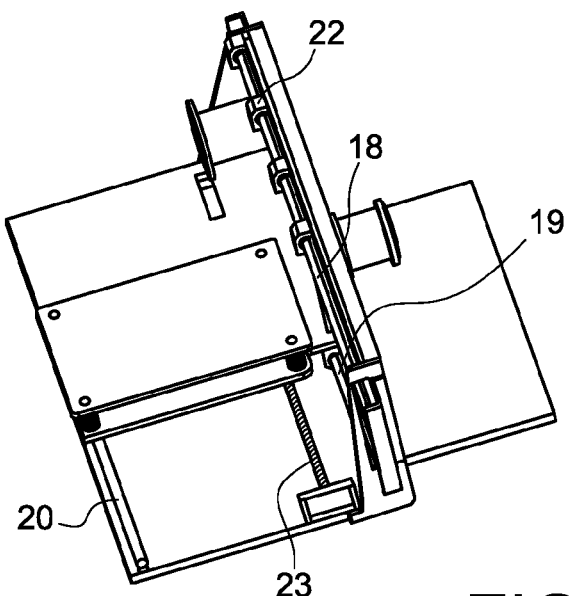
Figure 5:
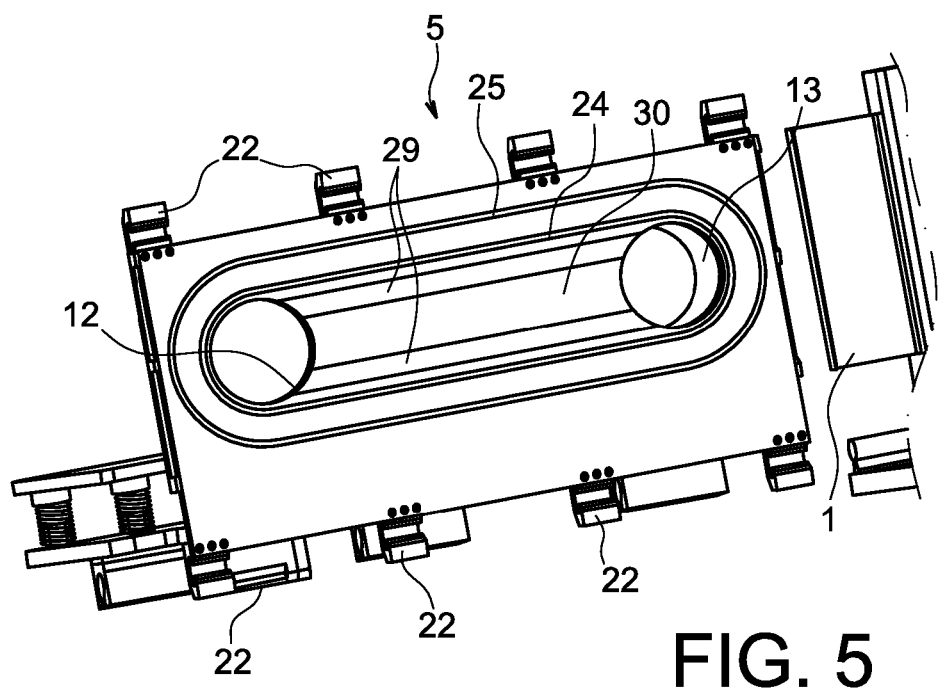
Figure 6:
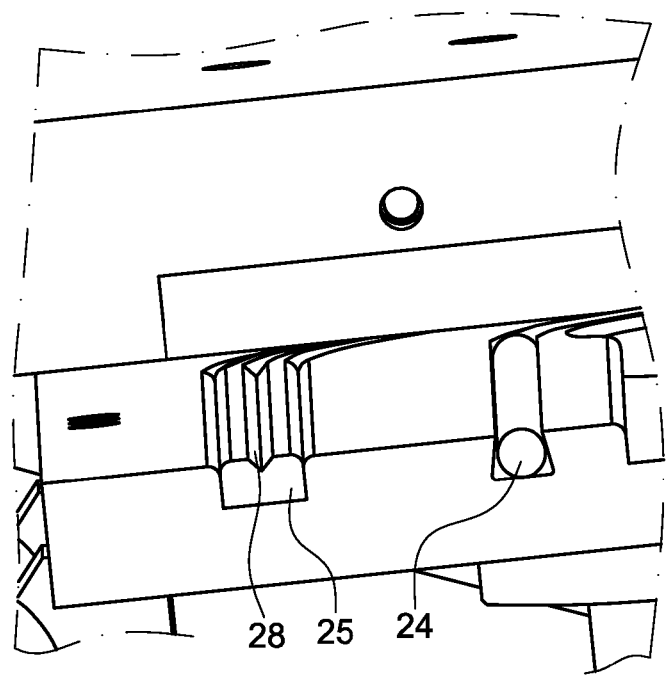
Figure 7:
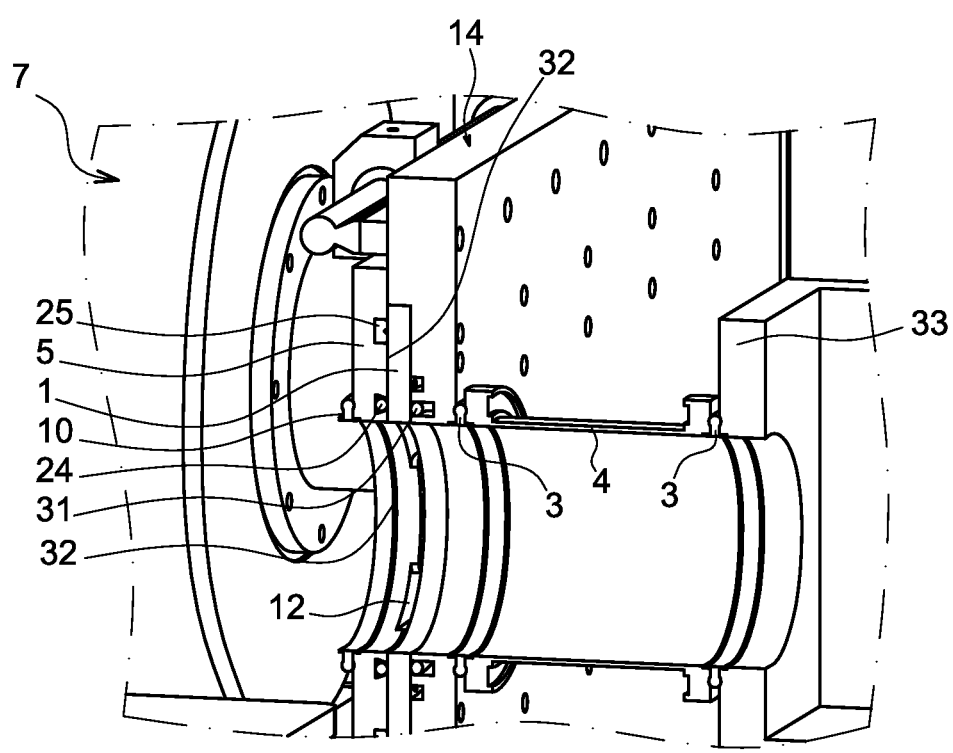

The invention will now be described in connection with the following figures, which illustrate a particular embodiment thereof:

FIGS. 1 and 2 are schematic representations of the device in its two main states, FIGS. 3 and 4 are two views of the device at different angles, FIG. 5 illustrates the face of the movable plate which is oriented towards the cavity under vacuum, FIG. 6 is a cross-section of the movable plate and the joints, and FIG. 7 is a general cross-section of the device.

As can be seen in FIGS. 1 and 2, a device in accordance with the invention comprises a first plate-shaped part 1 provided with a measuring location 2 which can be an opening oriented towards a vacuum enclosure such as a tube 4 accommodating an X ray beam through a connecting flange 3, or which can be a window, a receptacle, etc. and a second plate-shaped part 5 provided with two footprints 8 and 9 of detectors 6 and 7. The footprints 8 and 9 can comprise a flange 10 or 11 for sealingly assembling under vacuum one of the respective detectors 6 and 7 and drillings 12 and 13 passing through the second plate 5 and making the detectors 6 and 7 communicate with the volume between both plates 1 and 5, which is kept under vacuum. The second plate 5 is movable in front of the first one 1 so as to location each detector 6 and 7 in turn in front of the measuring location 2 to enable each detector 6 and 7 to carry out its measurement or observation.

A more detailed description of the invention will be discussed below. As shown in FIG. 3, a first plate 1 is embedded in a frame 14 provided with two stiffening side ribs 15 and 16. The frame 14 is joined to a support 17 perpendicular thereto. Slides 18, 19 and 20 are set on the frame 14 for the first two ones, on either side of the first plate 1, and on the support 17 for the third one. The second plate 5, parallel to the first plate 1, is joined to a bearing plate 21 perpendicular thereto and which extends in front of the support 17. Claws commonly referenced as 22 fasten both edges of the first plate 1 to both first slides 18 and 19, and the edge of the bearing plate 21, which is opposite to the second plate 5, to the third slide 20. The assembly enables the second plate 5 to be alternatively translated onto the first plate 1, the claws 22 sliding in the slides 18, 19 and 20, and it is flexible enough for a closed and sealed cavity to be set between the plates 1 and 5 and for the vacuum to be kept therein. The displacement can be ensured by any known means, for example (FIG. 4) by a transmission comprising a linear element 23 extending on the support plate 17 parallel to the slides and which can consist of a belt, an endless screw, a rack or a slider bar moved by a stepper motor not shown, and which is attached to a complementary element of the bearing plate 21. The movements of the second plate 5 are restricted by limit switches, in positions where the footprints 12 and 13 are lined up with the measuring location 2; mechanical stops can be added as a precaution, in case of failure of the switches. The footprints 12 and 13 line up with a measuring location 2 when the plate 5 reaches the limit switch attached to the plate 17 in the proximity of the transmission.

FIG. 5 represents the second plate 5 extracted from the rest of the device and mainly shows its face oriented to the first plate 1. There is an inner joint 24 having a closed contour and a coarsely elliptical shape surrounding the footprints 12 and 13, as well as an outer joint 25 surrounding the preceding one, also having a closed contour and an analogous shape. FIG. 6 shows that the inner joint 24 is O-ring, whereas the outer joint 25 is prismatic and comprises inter alia two planar facets 26 and 27 directed towards the first plate 1; they bound a central cavity 28 opening to the first plate 1 and containing a vacuum compatible lubricant reservoir. The joints 24 and 25 bear against the first plate 1 and bound with it and the second plate 5 a closed cavity wherein vacuum can be set. The outer joint 25 is made of rigid material, for example of PEEK (polyether ether acetone) so as to resist compression forces due to the vacuum between the plates 1 and 5 without being collapsed and thus without tolerating contacts between the plates 1 and 5. Its contact area with the first plate 1, through the planar facets 26 and 27, is relatively small to restrict friction forces. Its construction with a lubricant reservoir, together with a smooth surface of the first plate 1, which is polished, enables it to be slid on the first plate 1 with low friction in spite of compression. The inner joint 24 enables a second sealing barrier to be set, thanks to its flexibility which enables it to tightly fit the actual shapes of both plates 1 and 5. FIG. 5 further shows communications grooves 29 connecting the footprints 12 and 13, for the vacuum to be equalized therein, and a third joint 30, similar in its constitution to the outer joint 25, which extends parallel to the grooves 29, in the direction of displacement of the second plate 5, so as to also bear against the first plate 1 and prevent the plates 1 and 5 to be bent at the centre thereof.

Finally, FIG. 7 is a partial view of the device, which illustrates the connectedness of plates 1 and 5. 31 refers to a sealing joint provided between the first plate 1 and the frame 14, and 32 refers to the portion of the closed cavity which extends between both plates 1 and 5. The detector 6 located in front of the footprint 12 has not be shown. The closed cavity further comprises the inside of the tube 4 and the vacuum means can be set in an enclosure 33 located on the opposite side of this tube 4.

It is reminded that the invention is not restricted to this application but rather extends possibly to any device comprising a pair of part movable relative to one another and between which the pressure is lesser than outside, such that the differential pressure tends to collapse the parts against each other; and that it is not restricted to the vacuum either, wherein the pressure between the parts can be a partial pressure.

The invention claimed is:

1. A device for a relative displacement of two parts, a first one of the parts comprising a first plate provided with a polished surface and a measuring location, a second one of the parts comprising a second plate provided with two footprints for receiving detector measuring ends, the first part and the second part being movable with respect to each other in a direction of alignment of the two footprints so that the measuring location selectively registers with the footprints, wherein the second plate comprises a first joint having a continuous contour that surrounds the two footprints, the first joint being compressed between the first plate and the second plate and rubbing on the first plate, a lower pressure chamber being enclosed by the first plate, the second plate and the first joint, and the device further comprises a second joint that is compressed between the first plate and the second plate, the second joint being less deformable than the first joint and extending mainly in the direction of alignment of the two footprints.

2. The device according to claim 1, wherein the second joint comprises two parallel straight portions extending outside the lower pressure chamber, the first joint extending between said two parallel straight portions.

3. The device according to claim 2, wherein the second joint has a continuous contour and comprises end portions connecting the two parallel straight portions together.

4. The device according to claim 1, wherein the first joint is toroidal and the second joint comprises two planar surfaces rubbing on one of the plates, and a cavity between the planar surfaces.

5. The device according to claim 4, wherein said one of the plates is the first plate.

6. The device according to claim 1, further comprising a third joint compressed between the first plate and the second plate, the third joint being non-deformable, rectilinear, extending to a central region of the two parts and having a length directed along a direction of relative displacement.

7. The device according to claim 1, further comprising sliding mechanisms between the two parts, the sliding mechanisms allowing for the relative displacement of the two parts.

* * * * *